H. W. WELSH.
AUTOMATIC WEIGHING SCALE.
APPLICATION FILED APR. 6, 1914.

1,181,189.

Patented May 2, 1916.
7 SHEETS—SHEET 6.

WITNESSES:

INVENTOR
Henry W. Welsh
BY
Whittemore Hulbert & Whittemore
ATTORNEYS

UNITED STATES PATENT OFFICE.

HENRY W. WELSH, OF SHERBROOKE, QUEBEC, CANADA, ASSIGNOR TO E. AND T. FAIRBANKS AND COMPANY, OF ST. JOHNSBURY, VERMONT, A CORPORATION OF VERMONT.

AUTOMATIC WEIGHING-SCALE.

1,181,189.  Specification of Letters Patent.  Patented May 2, 1916.

Application filed April 6, 1914.   Serial No. 829,931.

*To all whom it may concern:*

Be it known that I, HENRY W. WELSH, a subject of the King of Great Britain and Ireland, residing at Sherbrooke, in the Province of Quebec and Dominion of Canada, have invented certain new and useful Improvements in Automatic Weighing-Scales, of which the following is a specification, reference being had therein to the accompanying drawings.

The invention relates to automatic weighing scales of that type employed for the weighing of various kinds of grain, and the invention has special reference, first, to means employed for quickly adjusting the scale for operation upon different kinds of grain; second, to the means for securing greater accuracy; and third, to the various features of construction as hereinafter set forth.

In the present state of the art automatic grain-weighing scales require adjustment when a change is made from one kind of grain to another. This is for the reason that in the automatic operation of the scale there is necessarily a column of grain in the air after the closing of the admission gate, the weight of which is added to the draft in the hopper. As this column cannot operate upon the weighing mechanism which controls the opening and closing of the gates and the tilting of the beam, the scale must be originally set to underweigh an amount exactly corresponding to that of the column in the air, but the weight of columns of different grains which are of the same cubical contents will vary, and consequently the scale must be adjusted where there is a change from one kind of grain to another. This is usually accomplished by shifting the weights, but the present invention eliminates the necessity of such an adjustment and accomplishes the desired result by maintaining the same weight of column regardless of the specific kind of grain forming the same.

As shown, 1 is the weighing beam of an automatic scale, which is fulcrumed in side frames 2 and 3 upon bearings 4.

5 is the hopper for receiving the draft of grain which is supported on bearings 5$^A$ on the beam.

Figure 1:
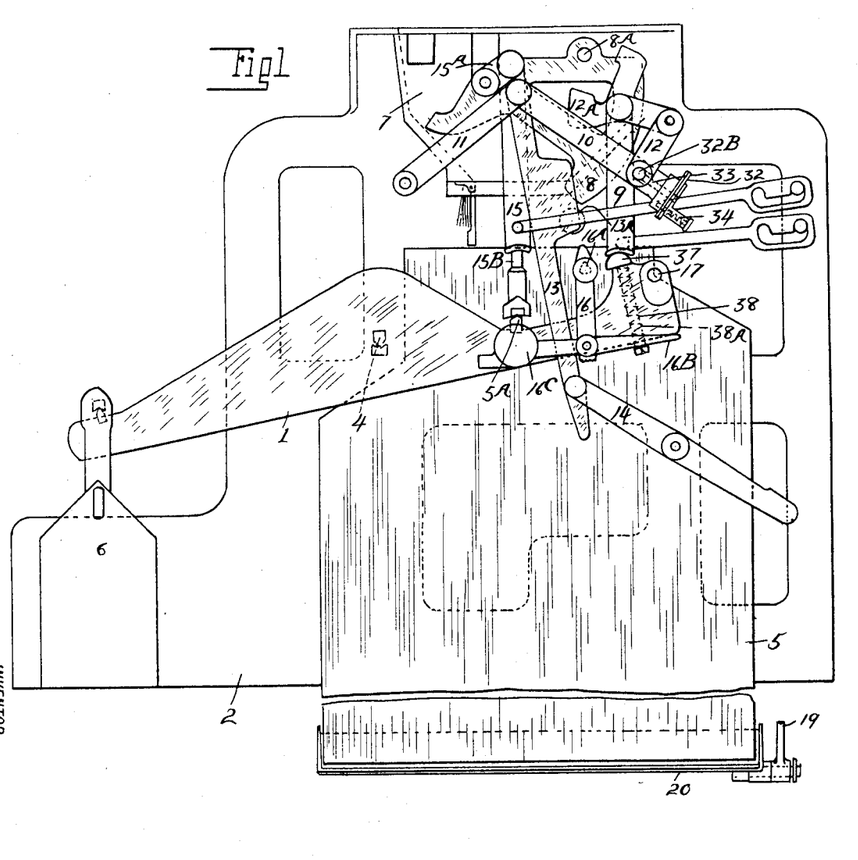
Figure 1 is a side elevation of a portion of a scale with the front frame removed, showing the parts in position of full opening of the admission gate.
Figure 2:
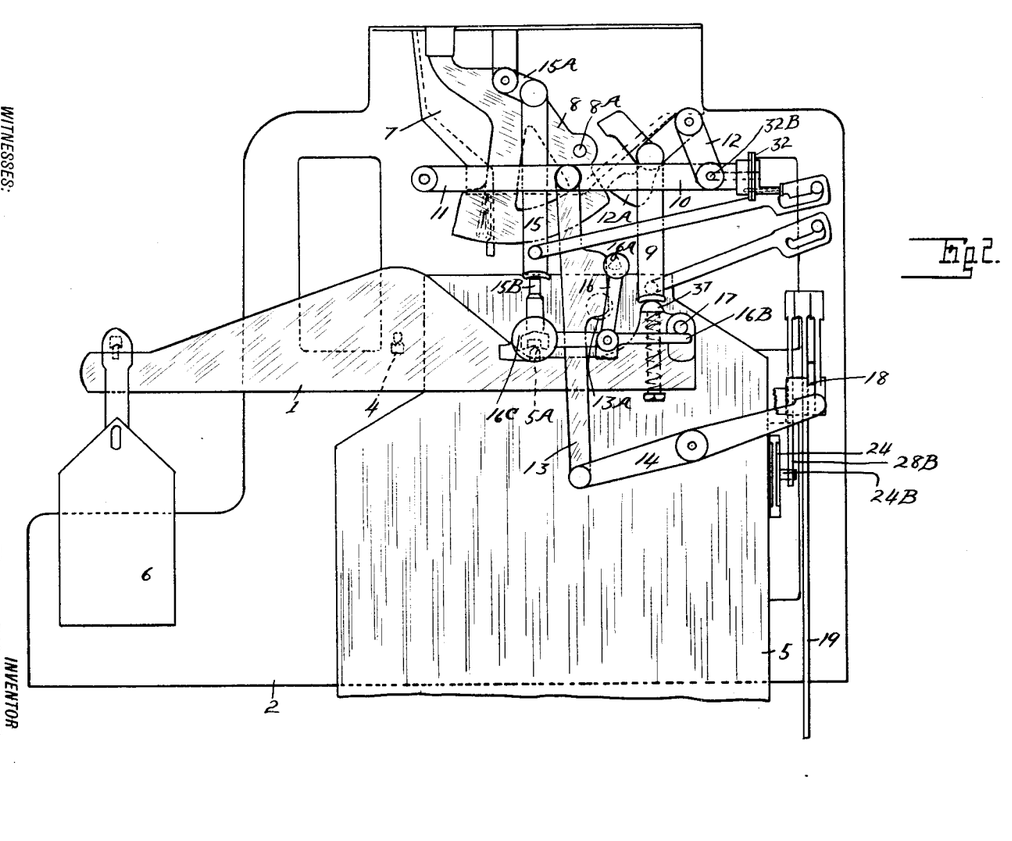
Fig. 2 is a similar view with the admission gate in closed position.
Figure 3:
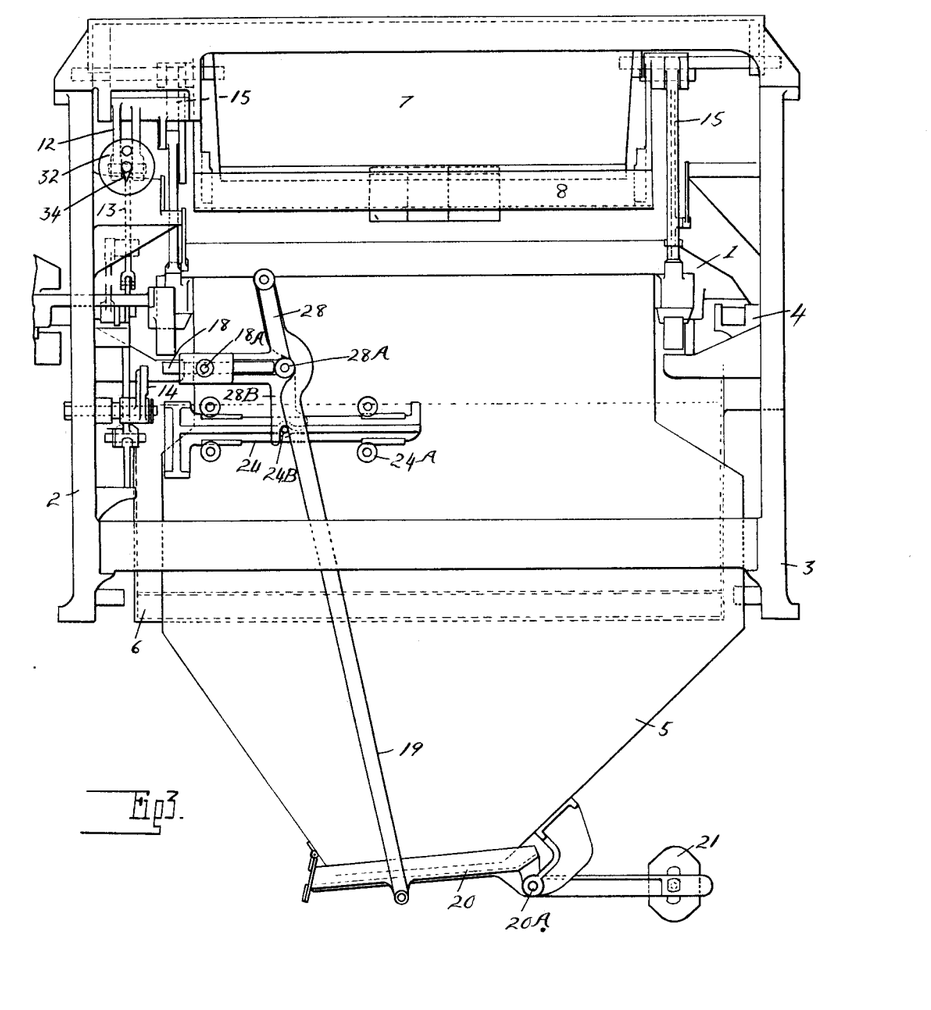
Fig. 3 is an elevation at right angles to Fig. 2.
Figure 4:
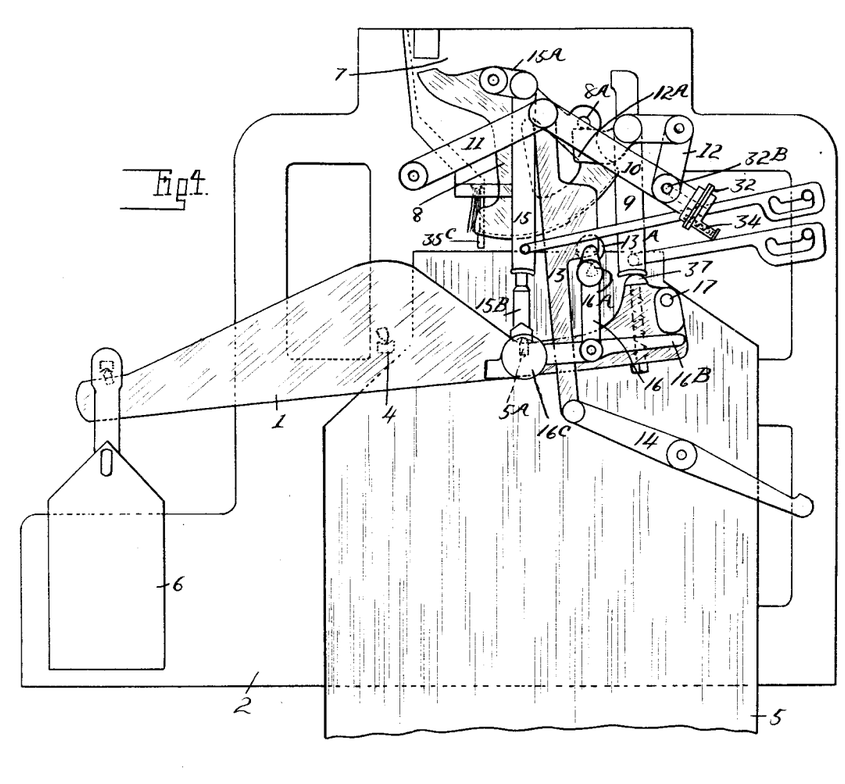
Fig. 4 is a view similar to Figs. 1 and 2, with the admission gate in dribble position.

6 is the weight box secured to the beam, 7 the feed chute and 8 the admission gate, which, when open, permits the grain to fall from said chute into the hopper. This admission gate is automatically opened and closed by the tilting of the beam 1, through the medium of mechanism of the following construction: 9 is a rod normally engaging a bearing upon the lever 1, and operating as a stop for preventing the upward movement of said lever under the actuation of the weights in the box 6. This stop arm 9 is connected to a pair of toggle links 10 and 11, through the medium of a bell-crank lever 12, the latter being fulcrumed upon the frame and being held from movement when the links 10 and 11 are in alinement with each other or upon their dead center. Thus in this position of parts, shown in Fig. 2 of the drawings, the stop rod 9 is held stationary and prevents any upward movement of the beam 1. The pivotal connection between the links 10 and 11 also connects to a rod 13, which is attached to a control lever 14 fulcrumed upon the frame, the arrangement being such that a rocking of this lever 14 in one direction will move upward the rod 13 and links 10 and 11, thereby moving the latter from off their dead center and permitting the rocking of the bell-crank 12 and upward movement of the stop rod 9 under the actuation of the lever 1. There is also provided an actuating connection for the admission gate 8, comprising a rod 15 connected to a crank 15$^A$ upon the pivotal frame of said admission gate, said rod at its lower end being arranged in the path of a bearing 15$^B$ upon the hopper 5. Thus, when said lever is permitted to move upward, it will simultaneously lift the gate 8 through the rod 15 and crank 15$^A$, opening the chute 7 and permitting the grain to discharge into the hopper. When, however, the hopper has received a sufficient weight of grain to overbalance the weights in the box 6, as well as the weight of the mechanism supported on the stop arms 9 and 15, there will be a downward tilting of the lever 1 and a downward movement of the mechanism supported thereon, which permits the gate 8 to move toward its closed position. Before said gate is completely closed a bearing 13$^A$ upon the rod 13 will strike against a bearing 16$^A$ upon a rockable lever 16 pivoted to the frame, and this, by arresting further downward movement of said rod 13 and mechanism supported thereby, will release the beam from the weight thereof and cause the hopper to pause in its downward movemnt. In the position where the bearing 13$^A$ engages with the stop 16$^A$, the lever 12 will be so positioned that an extension 12$^A$ thereof will be in the path of a finger 8$^A$ on the admission gate 8. The engagement of this finger 8$^A$ with the extension 12$^A$ will hold the gate from complete closing, but leaving merely a dribble opening, through which a thin stream of grain is permitted to still flow into the hopper until the weights in the box 6 are again balanced, and the hopper and the beam continue their downward movement. The further movement of the beam causes a finger 17 thereon to strike an arm 16$^B$ of the stop arm 16, rocking the latter so as to disengage the stop 16$^A$ from the bearing 13$^A$, thereby permitting the rod 13, links 10 and 11 and lever 12 to move farther, and by withdrawing the stop 12$^A$ from the finger 8$^A$ permitting the admission gate 8 to completely close.

In the operation above described, it is obvious that the size of the dribble opening is dependent upon the position of the stop arm or extension 12$^A$ of the lever 12, and this in turn is primarily dependent upon the position of the links 10 and 11, rod 13 and bearings 13$^A$ and 16$^A$. If the relative position of these parts were to remain constant then the size of this dribble opening would be always the same and consequently the weight of the column of grain which is in the air at the time of the complete closing of the admission gate would be the same in each succeeding draft where the same kind of grain is handled. On the other hand, if there is a change in the specific grain which is being weighed and the relative position of the parts remains the same, this would alter the weight of the grain column in the air, for the reason above stated, that equal volumes of different grains are of unequal weights. I have therefore provided means by which the mechanism controlling the gate 8 may be adjusted to vary the size of the dribble opening in the same ratio that the weight of one grain differs from that of another kind of grain. For instance, with the specific grains, oats, corn, barley, malt and wheat, the column of oats must be the largest and the column of wheat smallest to be of equal weight, while the intermediate grains vary proportionately. Thus, by providing means for properly adjusting the size of the dribble opening, the weighing of the scale will be the same with each of these grains. The preferred construction for effecting this adjustment comprises a slotted bearing in the link 10 for engaging the pivot pin 32$^B$ which connects said link with the lever 12. In this slotted bearing is an adjustable stem 33 which has a screw threaded engagement with a casing 32 and is attached to an index 34, adjustable to different marked positions upon the flange of the case 32. A locking device holding this index exactly in its various positions is preferably provided, comprising a spring-pressed locking pin 34$^A$, which is engageable with any one of a series of locking recesses 34$^B$ in the case 32. The different positions for the index are marked with the names of the various kinds of grain, so that all that the operator has to do is to disengage the locking bolt 34$^A$ and adjust the index to the proper position, which will result in a longitudinal shifting of the stem 33. This will provide different degrees of lost motion in the connection between the pin 32$^B$ and the link 10, which in turn will permit the stop arm extension 12$^A$ of the lever 12 to assume different positions and to arrest the gate 8 with different areas of dribble opening.

Figure 12:
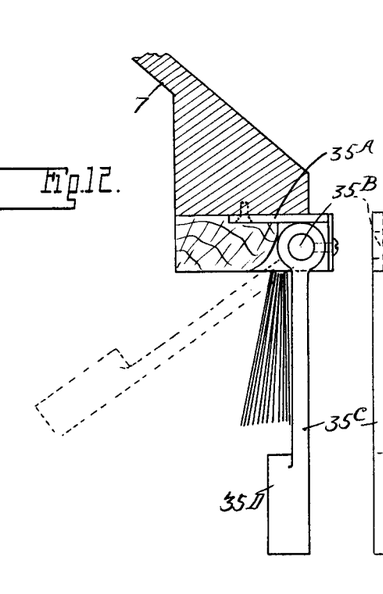
Figs. 12 and 13 are respectively a cross section and side elevation of the yieldable lining for the dribble opening.
Figure 13:
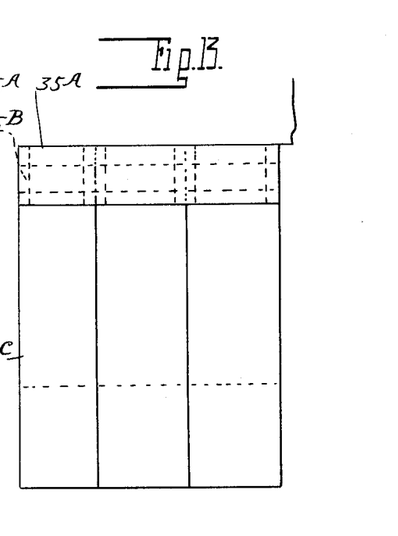
Figure 14:
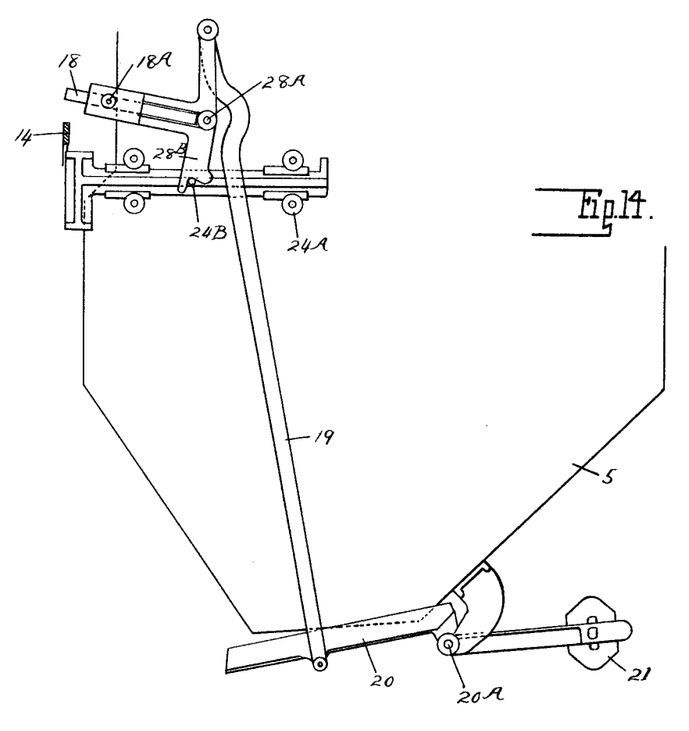
Fig. 14 is a view similar to Fig. 5, showing the parts in different positions of adjustment.

In the operation of the scale occasionally some foreign substance may be in with the grain, and if anything of an unyielding nature should lodge in the dribble opening there would be danger of breaking the gate when subsequently closed. This has been guarded against by lining the dribble opening with a brush, which is sufficiently yielding to permit the dislodgment of any hard foreign substance, but will keep approximately the same position when in contact with the grain. However, on account of the slight yielding by contact with the stream of grain, it is difficult to maintain exact dimensions in the open area. I have therefore provided a lining for the dribble opening which will maintain a fixed plane when under the action of the grain alone, but is capable of yielding to permit the ejection of a foreign substance. As shown in Figs. 12 and 13, 35$^A$ is a bracket or bearing upon the frame which supports the hopper for the admission gate, 35$^B$ is a shaft supported on the bracket 35^A and 35^C are metallic plates hinged upon the shaft 35^B and depending therefrom. Each of these plates is preferably weighted at its free end, as indicated at 35^D, so that it will normally be held by gravity in a fixed position at the side of the dribble opening. If, however, there is an obstruction lodged in the dribble opening, the closing of the gate 8 will force one or more of the hinged sections 35^C backward, thereby permitting the dislodgment of the obstacle, and the weights 35^D will then immediately return the plates to normal position.

The weighing hopper is emptied by the opening of the usual discharge gate 20, which is hinged at 20^A and is provided with a weighted arm 21 for automatically closing after the grain is discharged. The discharge gate 20 is controlled by a locking mechanism including the rods 19 attached pivotally at their lower end to the gate and at their upper ends to cranks 28 pivotally attached at 28^A to the hopper. These cranks are adapted to be thrown to their dead centers, in which position the gate 20 is locked closed against the weight of grain in the hopper. When, however, the crank is moved slightly off from its center the weight of the grain will open the gate 20 into discharging position. The cranks 28 are operated by a bell-crank arm 18 having a slidable bolt or extension 18^A which is adapted to project into the path of the lever 14. The member 28 is further provided with a downwardly-projecting arm 28^B, which is engageable with a pin 24^B upon a slidable bar 24 mounted upon the hopper, preferably upon roller bearings 24^A. The arrangement is such that when the crank 28 is thrown off from its dead center the weight of the grain in the hopper will cause the opening of the gate 20, which will rock the cranks 28 and the arm 28^B thereof, so as to project the sliding bar 24 into the path of the lever 14, while the return movement of the gate 20, due to the counterweight 21 after the grain has been discharged, will rock the cranks 28 and arm 28^B in reverse direction, withdrawing the bar 24 from the path of the lever 14, while the striking of the bolt 18 against the end of the lever 14 will move the latter, raising the rod 13 in the manner above described.

Figures 5, 6, 7, 8, 9:
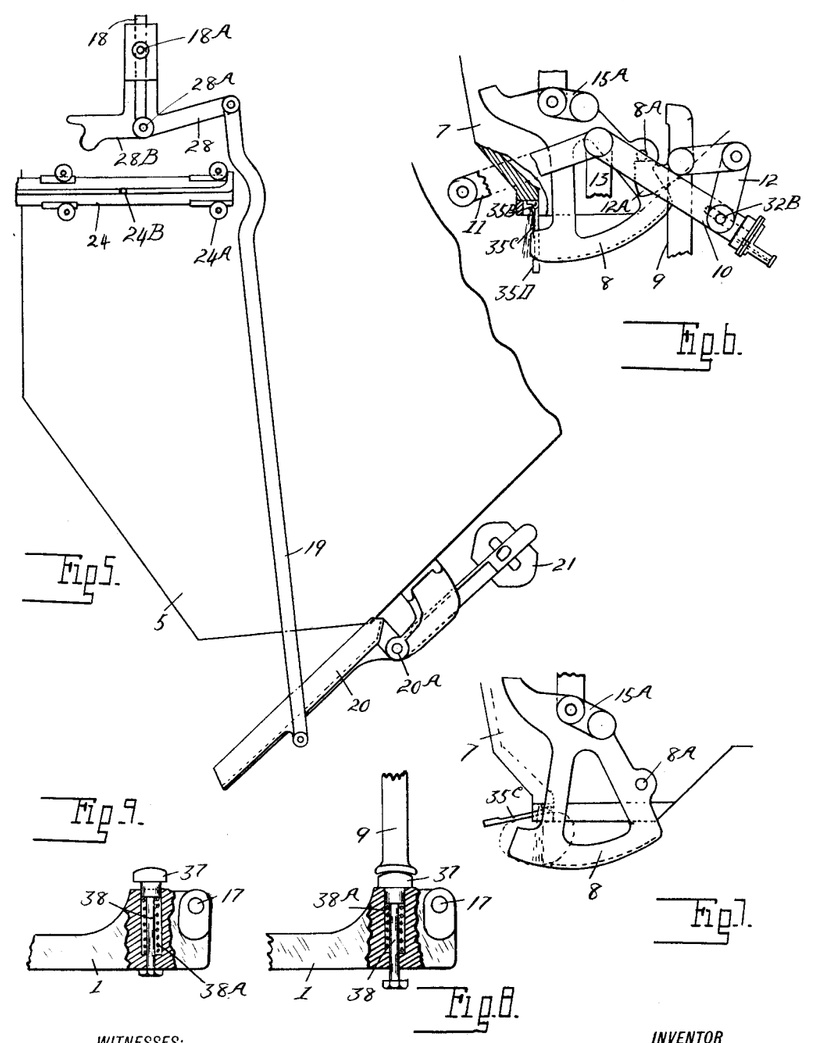
Fig. 5 shows the open position of the discharge gate.
Figs. 6 and 7 are diagrams showing different positions of the adjustment of the admission gate.
Figs. 8 and 9 are sections showing the yieldable buffer on the stop mechanism.
Figures 10, 11:
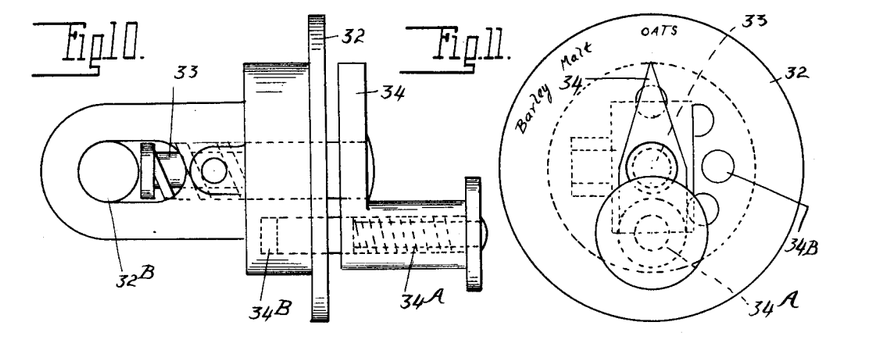
Fig. 10 is a section through the adjustment mechanism for different kinds of grains.
Fig. 11 is a front elevation thereof.

The complete operation of the scale is as follows: Assuming the parts of the mechanism as being in the position shown in Fig. 2, which is the position during the passage of a draft of grain from the hopper, it will be observed that the beam 1 and hopper 5, though relieved from the weight of grain, are still locked from movement by the stop rod 9, which stands in the path of a bearing on the lever. To lessen the impact of the beam against this stop, the bearing for engaging the latter is preferably yieldable, and, as shown in Figs. 8 and 9, comprises a head 37 upon a shank 38, which slidably engages a recess in the lever 1, containing a spring 38^A for yieldably projecting the head 37, and thus the spring will cushion the impact, and after said spring is compressed the head 37 will rest upon the lever and will bear against the stop 9. The stop 9 is held from upward movement by reason of the fact that the toggle links 10 and 11 are in alinement, or upon their dead center, which prevents rocking of the bell-crank lever 12 to which the stop rod 9 is attached. This position of parts continues until the grain having been entirely discharged from the hopper permits the gate 20 to close, which, through the rods 19, will throw upward the cranks 28, as above described, and in so doing will cause the bolt 18 to strike against the lever 14, actuating the latter, so as to raise the rod 13 and move the toggle links 10 and 11 off from the dead center position. This will permit the upward pressure of the beam 1 against the stop 9 to actuate the latter, rocking the bell-crank lever 12 and at the same time the bearing 5^A on the beam, actuating the rod 15, will cause the opening of the admission gate 8. This permits the falling of the hopper, the closing of the gate to dribble position and the final complete closing of the gate, as has been previously described. The stop-arm 16 is automatically thrown into position for arresting the gate in dribble position by a gravity arm 16^C, and during the final downward movement of the beam the finger 17 disengages the stop 16 by striking the arm 16^B. This permits the rod 13 and toggle links 10 and 11 to drop into the locking position shown in Fig. 2, while the dropping of these parts will actuate the lever 14, causing it to strike the bolt 18^A, which throws the crank 28 off from dead center, thereby unlocking the gate 20 and permitting the discharge of grain from the hopper, which completes the cycle.

What I claim as my invention is,—

1. In an automatic weighing scale, the combination with the admission gate and mechanism controlling the operation of said gate for the formation of a dribble opening, of means for effecting predetermined adjustments of area of said dribble opening respectively in proportion to the relative weights of different grains fed therethrough, and indicating means for said predetermined adjustments.

2. In an automatic weighing scale, the combination with an admission gate and mechanism controlling the opening and closing of the same, of a stop forming an element of said mechanism for arresting the closing of the gate to form a dribble opening, means for adjusting said stop to predetermined positions to obtain constant weight flows of the different materials passing through said dribble opening, the positions corresponding to the weights of the materials passing therethrough, and an indicator for said predetermined positions.

3. In an automatic weighing scale, the combination with an admission gate and mechanism for controlling the opening and closing of the same, of a stop for arresting the closing of said gate to form a dribble opening, means for adjusting said stop to a series of predetermined positions to vary the area of said dribble opening respectively in proportion to the relative weights of the different kinds of grain passing therethrough, and an indicator for said predetermined positions.

4. In an automatic weighing scale, the combination with an admission gate, of mechanism for opening and closing said gate adapted to form a dribble opening, means for adjusting said mechanism to a series of predetermined positions respectively corresponding to the weights of the different materials fed through said dribble opening to maintain a constant weight flow with each material, and indicating means for said predetermined positions.

5. In an automatic weighing scale, the combination with the weighing hopper, the beam and the admission gate, of mechanism actuated by the rise of said hopper and beam for opening said gate, locking mechanism for temporarily preventing the rise of said hopper and beam, a trip for said locking mechanism, and a stop controlled by said locking mechanism for arresting the closing said gate in dribble position.

6. In an automatic weighing scale, the combination with a hopper, the beam and the admission gate, of mechanism actuated by the rise of said hopper for opening said gate, mechanism automatically operating upon the fall of said hopper for locking said beam against rising, a trip for said locking mechanism, a stop for temporarily preventing the locking of said mechanism upon the downward movement of said beam, a stop carried by said mechanism for arresting said admission gate in dribble position while said mechanism is arrested from locking, and means for adjusting said last-mentioned stop to obtain different areas of dribble opening.

7. In an automatic weighing scale, the combination with the hopper, weighing beam and admission gate, of gravity-actuated mechanism for automatically locking said beam during the downward movement thereof against upward movement when relieved from load, a trip for releasing said locking mechanism, a stop for holding said mechanism from locking, means actuated by the upward movement of said beam for opening said admission gate, and a stop carried by said locking mechanism for arresting the closing movement of said admission gate in dribble position during the period in which said mechanism is held from locking by the first-mentioned stop.

8. In an automatic weighing scale, the combination with the hopper, weighing beam and admission gate, of mechanism actuated by the upward movement of said beam for opening said gate, mechanism for locking said beam from upward movement automatically operating by gravity during the downward movement of said beam, including toggle links, a bell-crank lever, a stop arm and a depending arm connected to the knuckle of said links, a stop for engaging said depending arm to hold said mechanism from locking, a trip for said stop, and a stop-arm connected to said bell-crank lever for arresting the closing movement of said admission gate in dribble position during the temporary arresting of said mechanism by said first-mentioned stop.

9. In an automatic weighing scale, the combination with a hopper, a weighing lever and admission gate, of means actuated by the upward movement of said lever for opening said admission gate, gravity-actuated locking mechanism for said beam when in depressed position comprising a pair of toggle links, a bell-crank lever, a stop arm and a rod connected to the knuckle of said links and depending therefrom, means engaging said depending arm for temporarily holding said mechanism from locking during the downward movement of said beam, a stop carried by said bell-crank lever for arresting the closing movement of said admission gate in dribble position, and means of adjustment between said stop and depending arm to vary the area of said dribble opening.

10. In an automatic weighing scale, the combination with a weighing beam and admission gate, of mechanism comprising a pair of toggle links, a bell-crank lever connected to one of said links, a depending stop-arm on said bell-crank lever and a depending rod, from the knuckle of said links, said mechanism being actuated by gravity to straighten said links and lock said stop-arm, a stop carried by said bell-crank lever for arresting the closing movement of the admission gate in dribble position, and means of adjustment between said stop and said toggle link for varying the area of the dribble opening.

11. In an automatic weighing scale, the combination with the weighing beam and admission gate, of mechanism actuated by the upward movement of said beam for opening said gate, gravity-actuated mechanism for automatically locking said beam when in depressed position against rising, a trip for said locking mechanism, means for preventing the locking of said mechanism during the initial downward movement of said beam, a stop for arresting the closing of said admission gate in dribble position, and an adjustable connection between said stop and locking mechanism to vary the area of said dribble opening.

12. In an automatic weighing scale, the combination with a weighing beam and admission gate of mechanism operated by the upward movement of said beam for opening said gate, mechanism including gravity-straightening toggle links, a lever connected thereto and a stop for said beam connected to said lever for locking said beam in depressed position against upward movement, a stop for holding said links from locking, a trip for withdrawing said stop, a stop for arresting closing of said admission gate during the arrest of said links by said first-mentioned stop, and means of adjustment between said last-mentioned stop and mechanism for varying the area of the dribble opening.

13. In an automatic weighing scale, the combination with the weighing beam of automatically-locking mechanism for preventing upward movement of said beam, including a stop-arm for said beam, and means for cushioning the impact of said beam against said stop arm.

14. In an automatic weighing scale, the combination with a weighing beam, of automatically-locking mechanism for arresting said beam in depressed position against rising, including a stop-arm for said beam, and means for cushioning the impact of said beam against said stop-arm, comprising a bearing on said beam and resilient compressible means between said bearing and beam.

15. In an automatic weighing scale, the combination with the admission gate, weighing beam and hopper, of mechanism actuated by the upward movement of said beam for opening said gate, gravity-actuated mechanism for locking said beam in depressed position against rising, including a stop-rod for said beam, a pair of gravity-straightening links, a lever connection between said links and stop-rod, a depending rod from the knuckle of said links and a lever connected to said depending rod, a discharge gate, locking mechanism for said discharge gate, and means actuated by the locking of said discharge gate for unlocking said beam-locking mechanism and for unlocking said discharge gate upon the locking of said beam-locking mechanism.

16. In an automatic weighing scale, the combination with the hopper, weighing beam, the admission and discharge gates, of mechanism actuated by the rising of the beam for opening the admission gate, mechanism for locking said beam in depressed position against rising, including a rockable lever, mechanism for locking the discharge gate upon the closing of the same, means actuated by the locking of said discharge gate for depressing said lever to unlock said beam-locking mechanism, means actuated by the locking of said beam-locking mechanism for releasing said discharge gate locking-mechanism and permitting the opening of the same by the weight of the grain, means actuated by the opening of said discharge gate for locking said lever to prevent the unlocking of said beam, and means actuated by the closing of said discharge gate for unlocking said lever in advance of the actuation of the same to unlock said beam.

17. In an automatic weighing scale, the combination with the admission gate and means for arresting the same in dribble position, of a yieldable member forming the wall of the dribble opening, comprising a hinged depending plate.

18. In an automatic weighing scale, the combination with the admission gate and means for arresting the same in dribble position, of a plurality of depending and independently-movable hinged members forming the wall of the dribble opening.

19. In an automatic weighing scale, the combination with the admission gate and means for arresting the same in dribble position, of a plurality of hinged plates forming the wall of the dribble opening, each of said plates being weighted to normally hold the same in fixed relation, but permitting of yielding to dislodge an obstruction.

20. In an automatic weighing scale, the combination with an admission gate, of mechanism for opening and closing said gate adapted to form a dribble opening, said mechanism including a bell-crank lever and toggle links, one of said toggle links having a slotted bearing engaged by said bell-crank lever, and an adjustable stem in said toggle link engaging said bell-crank lever.

In testimony whereof I affix my signature in presence of two witnesses.

HENRY W. WELSH.

Witnesses:
K. E. BARRETT.
J. STENSON.